United States Patent
Hawkins

(10) Patent No.: US 12,013,339 B2
(45) Date of Patent: Jun. 18, 2024

(54) AUTOMATED DISPLAY TEST SYSTEM

(71) Applicant: T-Mobile USA, Inc., Bellevue, WA (US)

(72) Inventor: Donald Lewis Dennis Hawkins, Kent, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 53 days.

(21) Appl. No.: 17/158,950

(22) Filed: Jan. 26, 2021

(65) Prior Publication Data

US 2022/0236184 A1    Jul. 28, 2022

(51) Int. Cl.
| | |
|---|---|
| G01N 21/64 | (2006.01) |
| G01J 3/50 | (2006.01) |
| G09G 3/00 | (2006.01) |
| G09G 5/10 | (2006.01) |

(52) U.S. Cl.
CPC ............ *G01N 21/64* (2013.01); *G09G 3/006* (2013.01); *G09G 5/10* (2013.01); *G01J 3/506* (2013.01); *G09G 2360/141* (2013.01); *G09G 2360/145* (2013.01)

(58) Field of Classification Search
CPC .......... G01N 21/64; G09G 3/006; G09G 5/10; G09G 2360/141; G09G 2360/145; G01J 3/506
See application file for complete search history.

(56) References Cited

U.S. PATENT DOCUMENTS

| | | | |
|---|---|---|---|
| 5,717,780 A * | 2/1998 | Mitsumune | H04N 17/04 382/148 |
| 7,239,161 B2 | 7/2007 | Iwanaga et al. | |
| 9,103,876 B2 * | 8/2015 | Nguyen | G01R 31/2893 |
| 10,338,036 B2 | 7/2019 | Grimard et al. | |
| 2008/0094081 A1 * | 4/2008 | Nguyen | G09G 3/006 324/750.19 |

(Continued)

FOREIGN PATENT DOCUMENTS

| | | |
|---|---|---|
| CN | 101118719 | 10/2009 |
| CN | 105374307 | 3/2016 |

(Continued)

OTHER PUBLICATIONS

"Information Display Measurements Standard", Video Electronics Standards Association (VESA) 2012, International Committee for Display Metrology (ICDM), Society for Information Display (SID), Definitions and Standards Committee, version 1.03, Jun. 1, 2012, 563 pages (split and uploaded into 5 parts).

(Continued)

*Primary Examiner* — Steven L Yeninas
*Assistant Examiner* — Dilara Sultana
(74) *Attorney, Agent, or Firm* — Lee & Hayes P.C.

(57) ABSTRACT

A system and method for autonomously testing display performance in which a scanning mechanism with a two-directional mobile gantry plate, a probe, and a controller automatically operate a test device to illuminate discrete areas of the display screen based on the detected screen size, correlate the tracking position of a measurement location on the display screen for each reading of an illuminated area in a dictionary, and perform one or more of a flicker test, a luminosity test, and a color state test at the determined locations.

20 Claims, 6 Drawing Sheets

(56) References Cited

U.S. PATENT DOCUMENTS

2019/0235997 A1* 8/2019 Mitchell ............... G06N 7/01

FOREIGN PATENT DOCUMENTS

| CN | 105845062 A | * | 8/2016 | ............... G09G 3/00 |
| CN | 111158177 A | * | 5/2020 | ........... G02F 1/1309 |
| JP | H0943292 A | * | 2/1997 | ........... G01M 11/00 |

OTHER PUBLICATIONS

Plglide HGS Hybrid Gantry System, "Hybrid Guide Design with Air Bearings and Recirculating Ball Bearing Guides for High Precision with Low Profile," retrieved from https://www.physikinstrumente.com/en/products/air-bearings-stages/a-341-piglide-hgs-hybrid-gantry-412418459/, 5 pages.

Downen, Phil, "A Closer Look at Flat-Panel-Display Measurement Standards and Trends," FPD measurement standards—2012—VESA—Information Display Measurement Standard, Jan. 6, 2012, pp. 16-21.

"Testing and Evaluating Displays and Projectors", Display Technologies Corp., https://www.displaymate.com/testing.html, Copyright 1990-2011.

Hoffman, Tony and Stobing, Chris "How We Test Monitors", PC Mag.com (www.pcmag.com/news/how-we-test-monitors), Oct. 11, 2019, pp. 1-11.

Soneira, Raymond M. "How We Test Mobile Displays", Display Technologies Corp., www.displaymate.com/mobile_testing.htm, Copyright 1990-2006.

* cited by examiner

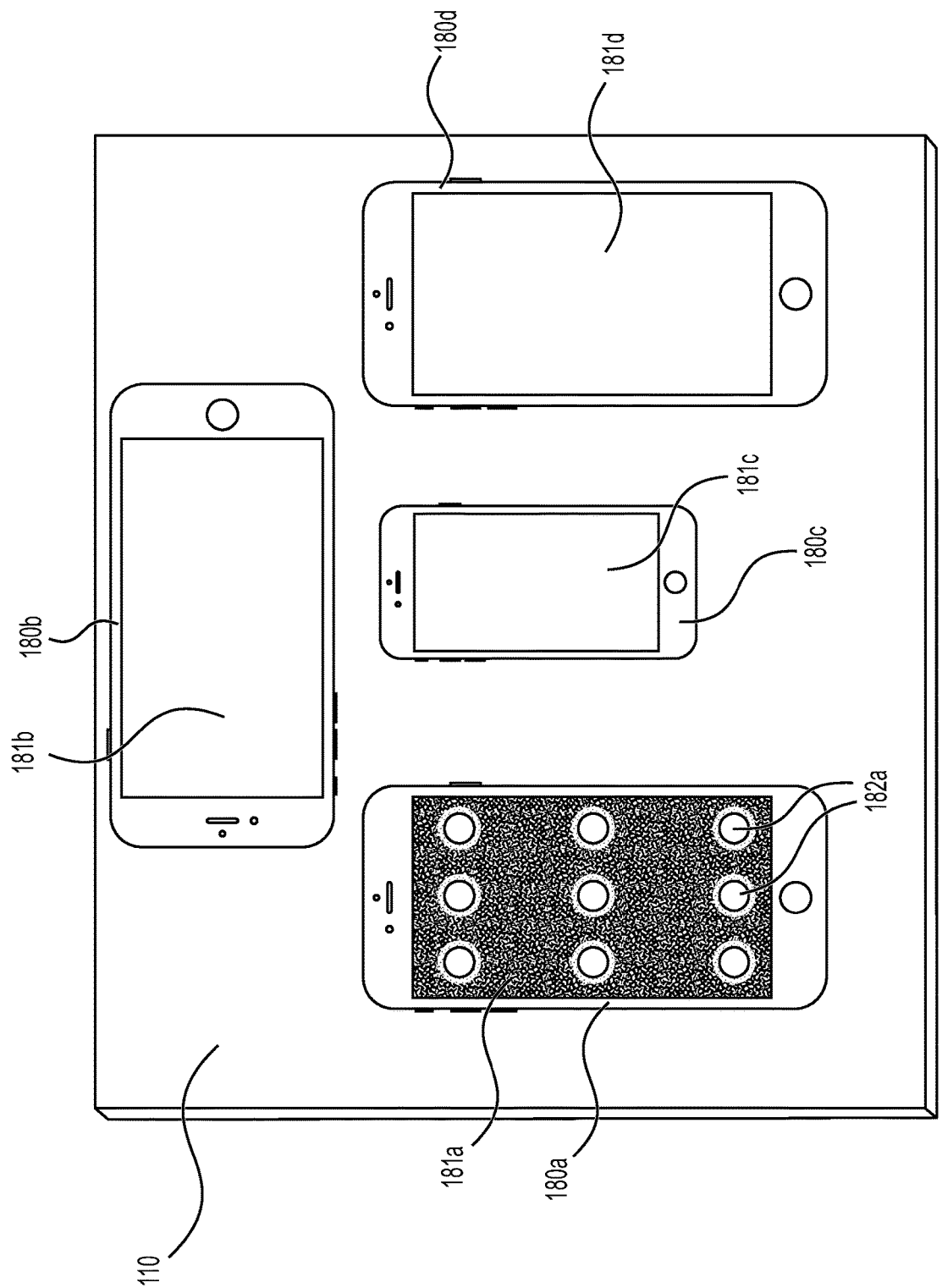

AUTOMATED DISPLAY TEST SYSTEM

BACKGROUND

Display screens of consumer electronics are expected to meet certain accepted performance standards. Display defects have historically been one of the leading causes of device returns. Ubiquitous portable electronic devices with high performance display screens include smart phones, tablets, and other portable computing devices. To ensure quality, the display screen of the electronic devices are tested and rated based on performance. Various industry standards have been developed to assess quality of a display screen based on its key performance indicators.

Although the device manufacturers typically maintain quality control, it is also important for distributors to ensure that the quality of the products they sell is acceptable. As the electronics continue to evolve, the display screen sizes constantly vary. This can pose an issue when carrying out a quality control testing procedure because it typically requires that each product be individually tested and independently measured with the screen size of the corresponding display being manually entered. This process can be error prone, inconsistent, and extremely time consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1C is an illustrative embodiment of a gantry plate with multiple devices under test (DUTs) secured thereon.

A DETAILED DESCRIPTION

Figure 1A:
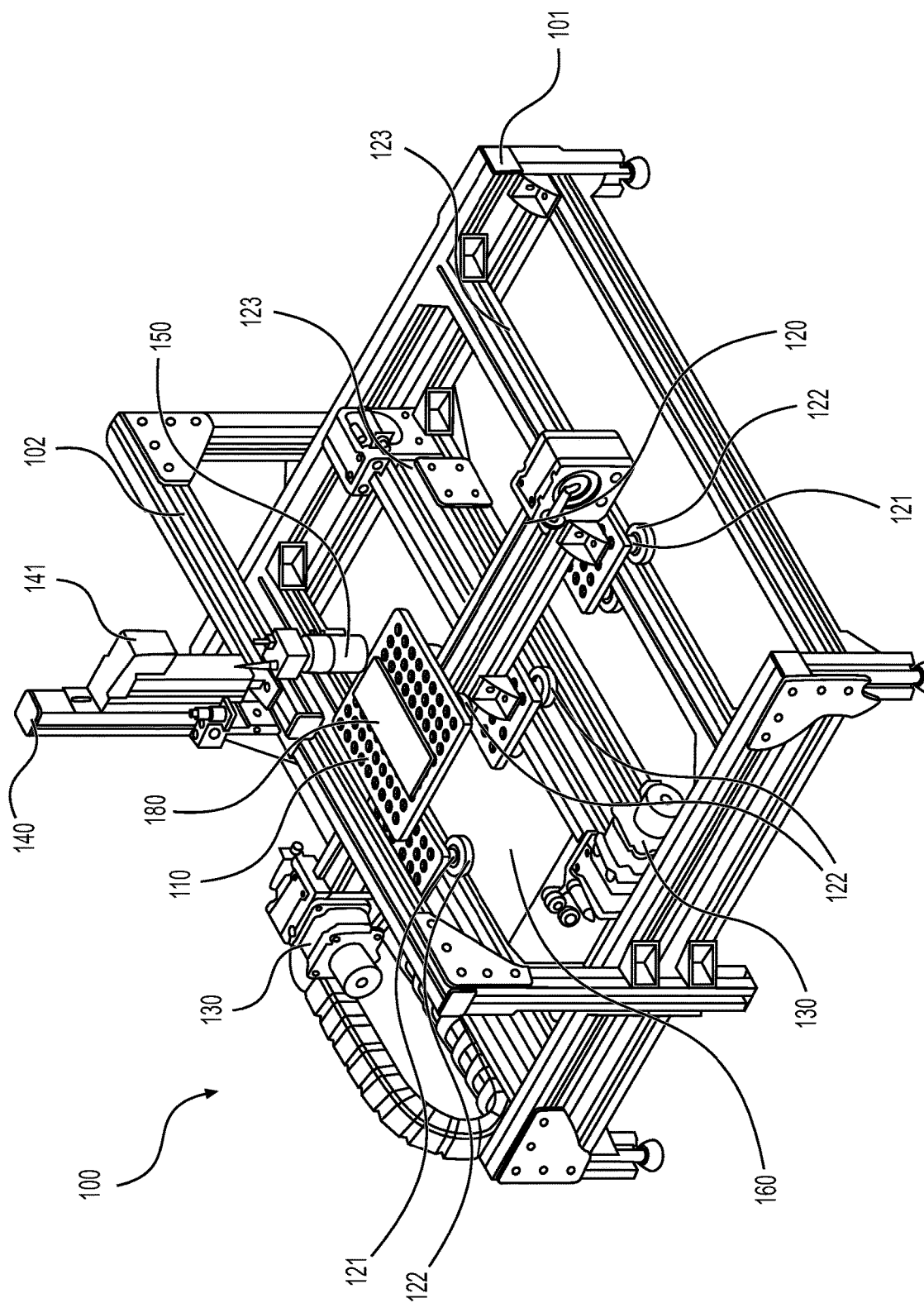
FIGS. 1A-1B are illustrative embodiments of a gantry system as described herein.

A system and method of automated calibration, testing, and report generation for display performance. The system and method can be employed to test and calibrate devices that have been fully manufactured, e.g. devices that are ready to be delivered to the end user.

Example embodiments include a scanning mechanism having a gantry system with a translating gantry plate that enables linear scans of the display screen surface of one or more DUTs. A DUT as referenced herein can include any known consumer electronics device that has a display screen. Non-limiting examples of a DUT include smart phones, tablets, personal computing devices such as laptops, other portable computing devices, monitors, media players, and the like. Using a gantry system can minimize vibration during scanning and testing.

In embodiments, the system can be used to autonomously and automatically identify points of interests and to carry out the actual calibration and testing at those identified locations.

Example embodiments of the system can include a software application designed to autonomously identify the test areas of a DUT display screen without requiring input of the screen size for the DUT. This allows for the system to be fully automated, more accurate, and more efficient. The software application can rely on the phone state information to cause the display screen brighten test areas at points of interests. For example, the application can cause the screen to display nine, equidistant, bright discrete areas corresponding to nine test areas.

The system can perform a linear scan of the screen of DUT to independently determine the location of the bright areas. The scanning can be performed in the X-Y directions using a probe. A sensor can be used to monitor the Z-axis distance between the scanning probe and the screen surface of the DUT. The probe used for scanning can be, for example, a color analyzer. In example embodiments, the scan can be performed by serial probing using a color analyzer to take readings at constant intervals. A step motor may be employed to perform the scan. Each interval can be, for example, approximately 1 mm Continuous readings may also be taken instead of or in addition to interval readings. As the readings are taken by the probe, a dictionary can be initiated correlating the step motor tracking for the X-Y location coordinates on a display screen where the probe takes a measurement or luminance reading and the luminance reading or value recorded at that location. The information can later be used to identify the points of interests for testing. Points of interests can be, for example, those areas of the screen with the brightest luminance.

In conjunction with identifying point of interests, the system can be used to test for flicker, luminosity, color state, and other screen performance at the points of interest using the dictionary to direct the probe. A report can be generated based on the testing to provide key performance indicators.

In example embodiments, a system can autonomously test display performance. The system can include a scanning mechanism comprising a two-directional mobile gantry plate, and the gantry plate can be configured to hold a test device having a display. A probe can be mounted on the scanning mechanism. A controller can be operably connected to the scanning mechanism and configured to automatically access a screen size of the test device display screen from hardware information stored in the test device. The controller can be configured to also operate a test device to illuminate discrete areas of the display screen based on the screen size of the test device. The controller can be configured to control the scanning mechanism to scan the display screen with the probe. The controller can also control the probe to record luminance readings of the display screen while the display screen is being scanned. The controller can track locations on the display screen where the recorded luminance readings are taken during the scan. The controller can correlate the tracked locations of the recorded luminance readings to the respective recorded luminance readings. The correlations of the tracked locations and the recorded luminance readings can be stored in memory. The controller can then determine locations of areas of the display screen at which the luminance readings are higher than the luminance reading taken at other areas of the display screen and perform one or more of a flicker test, luminosity test, and color state test at the determined locations.

The system can further include a sensor to sense the distance between the probe and a surface of the display screen. The probe can include a color analyzer for recording luminance readings. The controller can include a debug bridge to control the test device. The controller can also have an application programming interface for controlling the scanning mechanism.

The system can include one or more motors for operating one or more components of the scanning mechanism. Motors can be step motors. A step motor can be used to move the gantry plate during the scanning and track the movement.

The gantry plate can be configured to secure the test device (DUT) with the display screen facing the probe. The gantry plate can move in two directions. The two directions of movement of the gantry plate can be parallel to the surface of the display screen of the test device when mounted onto the gantry plate. The probe can be mounted onto an adjustable mount located over the gantry plate and configured to move the probe in a direction perpendicular to the surface of the display screen of the test device when mounted onto the gantry plate.

Example embodiments also include a method of autonomously testing a display screen. The method can include remotely accessing a test device using a controller and a debug bridge, automatically accessing screen size information of a display screen of the test device by remotely accessing hardware information from the test device, and remotely controlling the test device to illuminate a plurality of discrete areas of the display screen based on the screen size information. The method can also include scanning the display screen with a color analyzer and recording luminance readings at different locations of a surface of the display screen while translating the test device in two directions parallel to the surface of the display screen. The method can include tracking locations where on the display screen the luminance readings are recorded, correlating the recorded luminance readings with corresponding tracked locations of where the luminance readings were taken on the display screen, and storing the correlated information in memory. The method can also include testing the display screen for one or more of a flicker, luminosity, and color state using the color analyzer based on the stored correlated information.

The luminance readings can be recorded at constant intervals. The intervals can be approximately 1 mm in length. A dictionary can be created having a key and a value, wherein the key is either one of the luminance readings or the tracked locations of the luminance readings on the display screen, and the value is the other of the one luminance reading or the tracked location.

The method can include remotely controlling one or more display settings of the display screen during the testing.

The test device (DUT) can be placed on a gantry system equipped with the color analyzer prior to accessing the screen size information. The test device can be a first test device, and the method can include adding at least a second test device having a second display screen on the gantry system holding the first test device, and automatically accessing a second screen size of the second test device by remotely accessing hardware information of the second test device. The method can include remotely control the second test device to illuminate a plurality of areas of the second display screen based on the second screen size and scanning the second display screen and recording second luminance readings at different locations of a surface of the second display screen while simultaneously translating the second test device along with the first test device. The method can include correlating the recorded second luminance readings with second locations of the luminance readings on the second display screen and storing the additionally correlated information in the memory. The method can also include testing the second display screen for one or more of a flicker, luminosity, and color state using a color analyzer based on the stored additional correlated information.

Illuminating the plurality of discrete areas of the display screen based on screen size can include illuminating nine equidistant areas of the display screen. A perpendicular distance between the probe and the surface of a display screen can be controlled. Sensing the perpendicular distance between the probe and the surface of a display screen can be done with a sensor. A report based on the testing the display screen can be generated.

Figure 1B:
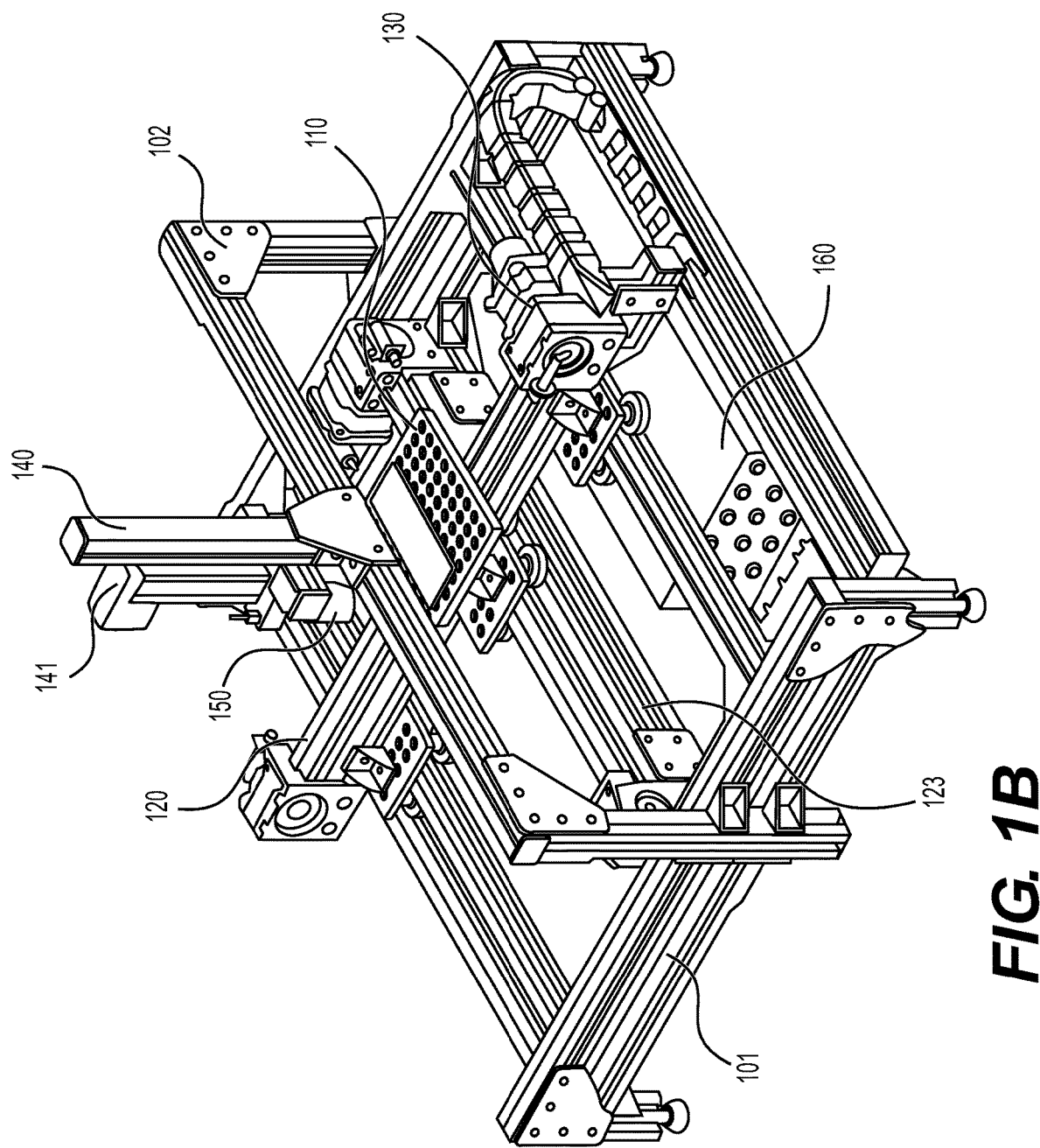

FIGS. 1A and 1B illustrate example embodiments of a system including a scanning mechanism to carry out the scanning and optionally the testing. As illustrated, the scanning mechanism can include a gantry system 100 having a base frame 101 and an overhead bridge 102. While the illustrated embodiment shows one overhead bridge 102, multiple overhead bridges 102 can also be implemented. A gantry plate 110 can be designed to hold one or more DUTs. The gantry plate 110 can be configured to move in one or more of the X-, Y-, and Z-directions. The gantry plate 110 can be a mono-directional, two-directional, or tri-directional mobile gantry plate. One or more motors 130 can be used to engage motion of one or more components of the gantry system. The motion of the gantry plate 110 can be guided using any one or more of tracks, rails, wheel systems or similar structures. A probe mount 140 can be connected to overhead bridge 102 and be configured to support a probe 150.

In the illustrated example embodiments, gantry plate 110 is a two-directional mobile gantry configured to move in the X-direction and Y-direction, but not in the Z-direction. The gantry plate can travel in the X-direction by way of one or more X-direction tracks 120. For illustrative purposes a single X-direction track 120 is shown, however, the system is not limited to a single track 120. Gantry plate 110 can engage track 120 through mechanical means that allow the gantry plate to travel along the length of track 120. In the illustrated embodiment, the mechanical means engaging gantry plate 110 to a track 120 can be a wheel system 121. The wheel system 121 can include one or more wheels 122. As illustrated, wheels 122 can be side friction wheels. The wheels 122 can be arranged horizontally and parallel the top surface of gantry plate 110. Wheels 122 can engage track 120 at one side or at both opposite sides of track 120. Alternatively, instead of having wheels 122 on both sides of track 120, wheel system 121 can engage track 120 at the opposite side from wheels 122 with a free gliding member that allows for engagement with track 120 without obstructing the movement along the length of the track. The wheel system 121 can remain engaged to track 120 while able to travel along the length of track 120. As the wheel system 121 travels, the gantry plate 110 connected to the wheel system 121 also travels along the length of track 120. In alternative embodiments, wheel system 121 can be replaced by a chain drive trail. Other like mechanisms may also be used. Also, any combination of different drive mechanisms can be used. For example, a wheel system can be combined with a chain drive.

To effectuate movement of gantry plate 110 in the Y-direction, track 120 can engage one or more Y-direction tracks 123. Track 120 can engage one or more tracks 123 by way of any mechanical means described earlier for how the gantry plate 110 can engage a track 120. For example, track 120 can engage one or more tracks 123 via a wheel system, a chain drive trail, a combination thereof, or any like systems. The means by which a track 120 engages one or more tracks 123 can be the same or different from the means by which gantry plate 110 engages a track 120. In the illustrative embodiment of FIGS. 1A and 1B, a track 120 engages three tracks 123 with a wheel system 124 similarly to wheel system 121 described above. Engaging a track 120 to more than one track 123 can provide added structural and dynamic stability. This can result in more accurate motion control.

One or more motors 130 can be used to operate the scanning mechanism. The one or more motors 130 can be any motor suitable for the intended use. In an example embodiment, a motor 130 can be a step motor. Other types of motors can also be used. For example, a motor 130 could be a servo motor. The motor 130 can be an electric motor. For example, motor 130 can be a DC motor or an AC motor. Motor 130 can be powered by batteries, or through a direct power connection. The power connection can be to either DC or AC current.

In the example embodiments of FIGS. 1A and 1B, one or more motors 130 can be used to operate cause motion of the gantry plate in the X-direction and Y-direction. one or more motors 130 can cause the gantry plate 110 to travel along the X-direction along track 120. In the illustrated embodiment, motor(s) 130 can also cause the track 120 to travel along the one or more tracks 123 to which track 120 is engaged. By these two motions, one or more motors 130 can cause gantry plate 110 to assume a full range of horizontal motion in the X-Y plane parallel to the top surface of gantry plate 110.

For purposes of this disclosure the X-Y plane refers to a plane that is parallel to the top surface of gantry plate 110 or the top surface of a DUT when secured onto the top surface of gantry plate 110.

One or more motors 130 can also be employed to move other components of the gantry system 100. For example, one or more motors 130 can be used to adjust the vertical position of a probe 150 affixed to a probe mount 140, as described in more detail below.

Any suitable material that provides proper stability may be used for the scanning mechanism and its components. In example embodiments, the gantry system and its components can be made of metal, plastic, wood, polymer or any combination thereof. In an example embodiment, frame 101, overhead bridge 102, gantry plate 110, tracks 120 and 123 and mount 140 can be made of the same or different materials. For example, these elements can be made of steel, aluminum, titanium, tungsten, or any alloy of one or more of these metals.

One or more motors 130 can further include a tracking system to register the displacement of the gantry plate within the X-Y plane of motion defined by the gantry system.

The accuracy of a motor can affect the accuracy of the measurements taken by the probe. In example embodiments, motor 130 is able to implement gantry plate motion in the X-direction and in the Y-direction by increments of 0.1 mm to 100 mm. For example, the increment of motion can be 0.1 mm, 0.2 mm, 0.3, mm, 0.4, mm, 0.5 mm, 0.6 mm, 0.7 mm, 0.8, 0.9 mm, 1 mm, 2 mm, 3 mm, 4 mm, 5 mm, 10 mm, 15 mm, 30 mm, 50 mm, 100 mm, or any combination thereof. Alternatively, the motion of the gantry plate can be modified by increments measured based on display pixels. For example, the gantry plate can be moved in an incremental distance equivalent to 1 pixel of a DUT display screen. The increments could alternatively be a distance that is greater than or less than the distance equivalent to one pixel. In example embodiments, the increments can be a distance equivalent to 1 pixel or more and 1000 pixels or less. For example, the increments can be a distance equivalent to 1 pixel, 2 pixels, 3 pixels, 4 pixels, 5 pixels, 10 pixels, 20 pixels, 30 pixels, 50 pixels, 100 pixels, 200 pixels, 500 pixels, 1000 pixels, or any combination thereof.

The one or more overhead bridges 102 can be configured to be fixed in place or mobile. In the example embodiment illustrated in FIGS. 1A and 1B, an overhead bridge 102 is shown as fixed in position by being secured to frame 101. In the alternative, an overhead bridge 102 can engage frame 101 by way of a mechanical means as similarly described earlier with respect to the engagement between gantry plate 110 and a track 120 or between a track 120 and one or more tracks 123. An overhead bridge 102 can also be fixed or adjustable in height. As illustrated in the example embodiments of FIGS. 1A and 1B, overhead bridge 102 is fixed in height. Motion of an overhead bridge 102 can be effectuated via one or more motors 130.

One or more probe mounts 140 can be affixed to an overhead bridge 102. A probe mount 140 can be stationary or mobile. A mobile mount may, for example, be configured to move along over at least a portion of the length of an overhead bridge 102. Movement of a mount 140 along an overhead bridge 102 can be accomplished using one or more motors 130.

Illustrated in FIGS. 1A and 1B, a probe mount 140 is a stationary structure affixed to an overhead bridge 102 at a stationary position. For example, a mount 140 can be affixed to the midpoint of the horizontal length of an overhead bridge 102.

A probe mount 140 can be designed to support one or more measuring devices. For example, as illustrated, a probe mount 140 can support one or more probes 150. A probe mount may also support one or more sensors 141. A probe mount 140 can allow for vertical adjustment of the one or more probes 150. Vertical adjustment of one or more probes 150 can be done manually or by using one or more motors 130.

In the illustrated example embodiments, a probe mount 140 supports a probe 150 and a sensor 141. Sensor 141 can measure the linear distance between probe 150 and the gantry plate 110 or a DUT located on the top surface of gantry plate 110. The system can then adjust the vertical position of probe 150 to maintain or vary the linear distance between probe 150 and gantry plate 110 and/or DUT located on the top surface of gantry plate 110. In embodiments, the linear distance between probe 150 and a DUT can be the linear distance between probe 150 and the surface of a DUT display screen facing probe 150.

A probe 150 can be a color analyzer. The color analyzer can be configured for serial communication triggers and collections of readings. The color analyzer can collect various measurement. The color analyzer can collect luminance readings. The color analyzer can collect chromaticity readings. The color analyzer can collect waveform reading. The color analyzer can take flicker measurements. Any suitable color analyzer can be used. In an example embodiment, at least one probe 150 can be a Konica-Minolta CA-410. However, this is simply an example. The one or more probes 150, including any color analyzer can be controlled by controller 160. In embodiments, one or more probes 150 can be controlled by means other than controller 160.

In some embodiments, a calibration trigger can be employed to limit a probe 150 functionality. For example, a calibration trigger can prevent probe 150 from taking a measurement if it is determined, for example via a sensor 141, that probe 150 is too far away from or too close to the display screen of a DUT. This can ensure that the scanning and testing described herein are carried out while maintaining a certain vertical distance between probe 150 and the display screen of a DUT. In some embodiments, a predetermined vertical distance between probe 150 and the display screen of a DUT to be maintained during testing can be set in accordance with industry standards.

The system can include one or more sensors 141. One or more sensors 141 can be provided anywhere on the scanning mechanism. For example, one or more sensors 141 can be provided anywhere on gantry system 100, including on frame 101, overhead bridge 102, gantry plate 110, tracks 120 and 123, wheel systems 121 and 124, wheels 122, probe mount 140, step motor 130, or any combination thereof. Any suitable sensor can be used for sensors 141. In an example embodiment, a sensor 141 can be an infrared sensor, a laser sensor, ultrasonic sensor, LED time-of-flight distance sensor, proximity sensor or any combination thereof. Sensors 141 can be used to monitor the motion of various component and the state or conditions of one or more components of the scanning mechanism including any one or more of the components of gantry system 100 described herein. One or more sensors 141 can be placed anywhere in the scanning mechanism, including anywhere in the gantry system 100 in a manner that does not interfere with the robotic movements of the various components of gantry system 100 or the scanning and testing of the one or more DUTs 180.

Illustrated in the example embodiments of FIGS. 1A and 1B, at least one sensor 141 is provided on probe mount 140. Sensor 141 can be configured to determine the vertical distance between probe 150 and either gantry plate 110 or the top surface of a DUT provided on top of gantry plate 110. One or more additional sensors 141 can be used to further gauge accurate readings of position of the gantry plate 110 and location of the probe 150 relative to the X-Y plane of a display screen being measured or tested. The one or more sensors 141 can communicate with and optionally be controlled by controller 160, probe 150, other components in the gantry system 100, or any combination thereof.

Gantry Plate 110 can have a generally planar surface configured to hold one or more DUTs 180. Each DUT can have a display screen 181. In an example embodiment, gantry plate 110 can be sized to hold only a single DUT 180. In an alternative embodiment, gantry plate 110 can be sized to receive two or more DUTs 180. The gantry plate 110 can also be designed to accommodate DUTs 180 of different types and/or sizes.

A DUT 180 can be secured to the top surface of gantry plate 110 by any suitable means. For example, a DUT 180 can be secured to the top surface of gantry plate 110 by one or more clamps, magnets, adhesives, fitting, screws or any combination thereof. In example embodiments, one or more DUTs 180 can be removably secured to the gantry plate 110. In this manner, the one or more DUTs 180 can be secured in place during scanning and testing processes but, can be easily removed without being damaged afterward. In the example embodiments illustrated in FIGS. 1A and 1B, gantry plate 110 is illustrated as holding a single DUT 180. In an example embodiment illustrated in FIG. 1C, gantry plate 110 is illustrated as holding multiple DUTs 180a, 180b, 180c, and 180d. DUTs 180a-180d are illustrated as having different size display screens 181a-181d. However, DUTs can also all have the same size display screen size. DUT 180a is illustrated as showing discrete areas 182a that are bright objects over a dark background using during the scanning process described herein.

The scanning mechanism can include one or more controllers 160. A controller 160 can include one or more processor(s) as a central processing unit (CPU), a graphics processing unit (GPU), both CPU and GPU, or other processing unit or component known in the art.

Controller 160 can include data storage devices (removable and/or non-removable) such as, for example, magnetic disks, optical disks, or tape. Non-transitory computer-readable media may include volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by controller 160. Any such computer-readable storage media can be part of controller 160. In various examples, any or all of the system memory, removable storage, and non-removable storage, store programming instructions which, when executed, implement some or all of the operations described herein of controller 160 as it controls the scanning mechanism including gantry system 100 and its components, one or more DUTs 180, or any combination thereof.

Controller 160 can also have one or more input device(s) such as a keyboard, a mouse, a touch-sensitive display, voice input device, etc. Output device(s) such as a display, speakers, a printer, etc. can also be included. Controller 160 can also include one or more transceiver(s) that allow controller 160 to communicate with other devices, such as remote controllers, user personal devices, DUTs and other devices like devices. Such transceiver(s) can include any wired or wireless communication device(s). Wireless communication can be by any one or more of wide area network, local area network, radio frequency, bluetooth or any similarly suitable communication. Wired communication can employ the use of any suitable wiring equipment, including one or more ethernet cable, USB cable, video cable, HDM cable, phone cord, or any like structure.

Although referenced herein in the singular form, controller 160 can include a set of multiple controllers. In embodiments with multiple controllers, the different controllers can be in communication with each other and coordinate the commands described herein.

Controller 160 can be operably connected to the scanning mechanism. Illustrated in the example embodiments of FIGS. 1A and 1B, controller 160 is physically connected to gantry system 100. Alternatively, controller 160 can be remote to or separate and apart from the gantry system 100. Controller 160, even if physically separate from the gantry system 100 can control and communicate the one or more motors, probes, sensors either wirelessly or via cable as described earlier.

Controller 160 can include software to communicate with the one or more DUTs 180. Controller 160 can set DUT state for test scenarios. In example embodiments, controller 160 can set one or more of DUT applications, images, and brightness sweeps. Any suitable software can be used. In example embodiments, one or more command-line tools that allow for communication between controller 160 and a DUT can be implemented. The software can be loaded into controller 160. A debug bridge is an example type of software that can be employed.

In example embodiments, controller 160 can include an android debug bridge (ADB). The ADB command can facilitate a variety of device actions, such as installing and debugging applications. The ADB can also provide access to a Unix shell that can be used to run a variety of commands on a DUT.

The ADB can be generally a client-server program that can include a client, which sends commands, a daemon (ADBD), and a server, which manages communication between the client and the daemon. The client can run commands on a DUT. The client can run on the one or more controller 160. A command-line terminal can be used to invoke a client by issuing an ADB command. The daemon can run as a background process on each DUT 180. The server can run as a background process on controller 160.

At the start, the client can first check whether there is an ADB server process already running. If there is not, the client can start the server process. Once started, the server can bind to a local port, such as a TCP port and listen for commands sent from ADB client. The server can then set up connections to all running DUTs 180. The server can locate emulators by scanning for ports. Where the server finds an ADB daemon (ADBD), it can set up a connection to that port. If multiple DUTs are running, the system can specify the target DUT when issuing an ADB command. ADB commands can be issued from a command line on controller 160 or from a script.

As discussed earlier, the connections made by controller 160 to the one or more DUTs 180 can be via cable, for example USB cable, or wirelessly, for example by having all DUTs 180 and controller 160 on the same wireless network. As described earlier, other wireless connections can be used, such a via a Bluetooth connection.

Controller 160 can include any suitable software to communicate and control the gantry system 100, including any components thereof. For example, controller 160 can include centralizing application-level software. The software can interact with various devices (such as robotic devices, sensors, devices, and data acquisition equipment) and deliver the required application behavior. In example embodiments, application-level software can be configured to control the robotics of the gantry system 100 described earlier. For example, the software can control the movements of the gantry plate 110, tracks 120 and 123 along with respective mechanisms such as wheel systems, one or more motors 130, probe mounts 140, one or more probes 150, and the one or more sensors 141. The software can further coordinate the collection and processing of the data generated during data acquisition. In example embodiments, the software can be used together with an application programming interface (API) as described herein.

In example embodiments, controller 160 can include software to orchestrate calibration, test runs, and results generation. Any suitable software can be employed for this purpose. In example embodiments, controller 160 can use an API. The API can be entirely custom, specific to a component, or designed based on an industry-standard to ensure interoperability.

In example embodiments, controller 160 can run an API system integration. The software can include a system of libraries that enable serial communication to probe 150, such as for example a color analyzer, ADB serial communications to the one or more DUTs 180, an API for the machine controller, and suitable software for report generation.

In an example embodiment, the software can be implemented using a Python system of libraries that include one or more of pySerial package for serial communication with a color analyzer 150, pyADB package for ADB serial communications to the one or more DUTs 180, MachineMotion API supplied by Vention Inc. for machine control of gantry system 100, and pyPlot/MatLib packages for report generation.

Controller 160 can include software to run a screen calibration process. The screen calibration can be performed autonomously. The screen calibration can cause one or more DUTs 180 to illuminate objects on the respective DUT display screens. The illuminated objects can then be scanned and used for testing.

In example embodiment, the screen calibration can be carried out autonomously without requiring a user input. For example, the screen calibration may not require user input of a DUT information such as display screen size, or nature of the electronic device. Instead, the screen calibration can autonomously and dynamically set luminate objects on the one or more DUT display screens. This can lead to a more efficient, more accurate, and more consistent and repeatable calibration of various devices.

The location of the luminate objects used for testing is dependent on the display screen size. The luminate objects can be disposed in a manner that allows the system to later carry out testing of display screen performance in accordance with acceptable industry standards.

Through the ADB connection either via USB or wirelessly as described earlier, controller 160 can communicate with the one or more DUTs 180 provided on gantry plate 110. Through this connection, controller 160 can control brightness levels and load software applications to each of the DUTs 180. In this manner, controller 160 can then employ a software application to illuminate discrete areas of the display based on screen size. For example, controller 160 can employ the software application to set the desired luminate objects on the display screens of the one or more DUTs 180.

Install and start of the process can be achieved via commands that can be sent through the pyADB package. In example embodiment, the commands can include an ADB install using a message-passing standard, for example TMPI Android package, and ADB shell activity manager start TMPI package. In embodiments, the TMPI Android package can be preloaded on controller 160 that is executing the test procedures.

In example embodiments, an Android software application used to set the luminate objects can use gravity centered white on black gradient button image objects contained in a LinearLayout view. A LinearLayout as used herein refers to a layout that arranges other views either horizontally in a single column or vertically in a single row. In example embodiments, the image objects are contained in a 3×3 LinearLayout view.

The LinearLayout view can be contained in a single FrameLayout view. A FrameLayout can be designed to block out an area on the screen to display a single item. FrameLayout can be used to hold either a single child view or multiple children views. When using multiple children views, the position of each child view within the FrameLayout can be controlled by assigning gravity to each child.

In some embodiments, each view can be made as large as possible within the display screen of a given DUT 180 by using a Match_Parent constant for every layout. In this manner, there is no need to enter the screen size of each DUT. Instead, the system can access the screen size of a DUT from the hardware information stored in the DUT such as, for example, from the DUT firmware. The software can then place the center of the images equidistant from each other and the sides of the screen by centering the gravity of the children and adding padding to the FrameLayout. In embodiments, the added padding at the top and bottom of each object can be equal to half of the button image height. In embodiments, the added padding to the sides, can be half of the button image width.

In an example embodiment, the following code can be employed to implement the above described image display:

```
<FrameLayout android:layout_width='match_parent"
    android:layout_height="match_parent"
    android:fitsSystemWindows="true">
    <LinearLayout
        android:layout_width="0dp"
        android:layout_height="match_parent"
        android:layout_weight="1"
        android:orientation="vertical">
        <LinearLayout . . .>
        <LinearLayout . . .>
        <LinearLayout . . .>
    </LinearLayout>
    <LinearLayout
        android:layout_width="match_parent"
        android:layout_height="match_parent"
        android:orientation="horizontal">
        <LinearLayout . . .>
        <LinearLayout . . .>
        <LinearLayout . . .>
    </LinearLayout>
</FrameLayout>
```

Having equidistant images on the display screen is only one example embodiment. The padding values can be adjusted as desired to achieve the desired distances either between images or between images and the edge of the display screen. The padding values can be adjusted based on the desired industry standards being employed for the testing of the display screen. In some embodiments, equidistance between images or with the display screen edge may not be desired. For example, the padding values can be adjusted to match the distances set by VESA FPDM methods that requires different distances from the edge of the display screen.

Controller 160 can run the above routine for each of the one or more DUTs 180 placed on the gantry plate 110 and operably connected to controller 160. The routine in each DUT can be run simultaneously, in series, or any combination thereof. Once the routine has run, each display screen of the DUT will display luminance images. In example embodiments, each DUT display will display nine bright images on a black background. When multiple DUTs 180 are placed on gantry plate 110, the display of each DUT can be illuminated only while the display screen of that particular DUT is being scanned and tested. Alternatively, the display screen of all DUTs can be illuminated simultaneously.

After discrete areas of the display screen of a DUT have been illuminated, i.e. after the luminance images have been set, the system can perform a scanning of the display screen for each of the one or more DUTs 180 to determine the respective points of interest for each DUT 180. This calibration process can generate a 2D array containing sequence number and luminosity and dictionary with sequence as key and XY motor positions as value declared. These values can be then used to conduct the diagnostics of each DUT display screen.

Figure 2:
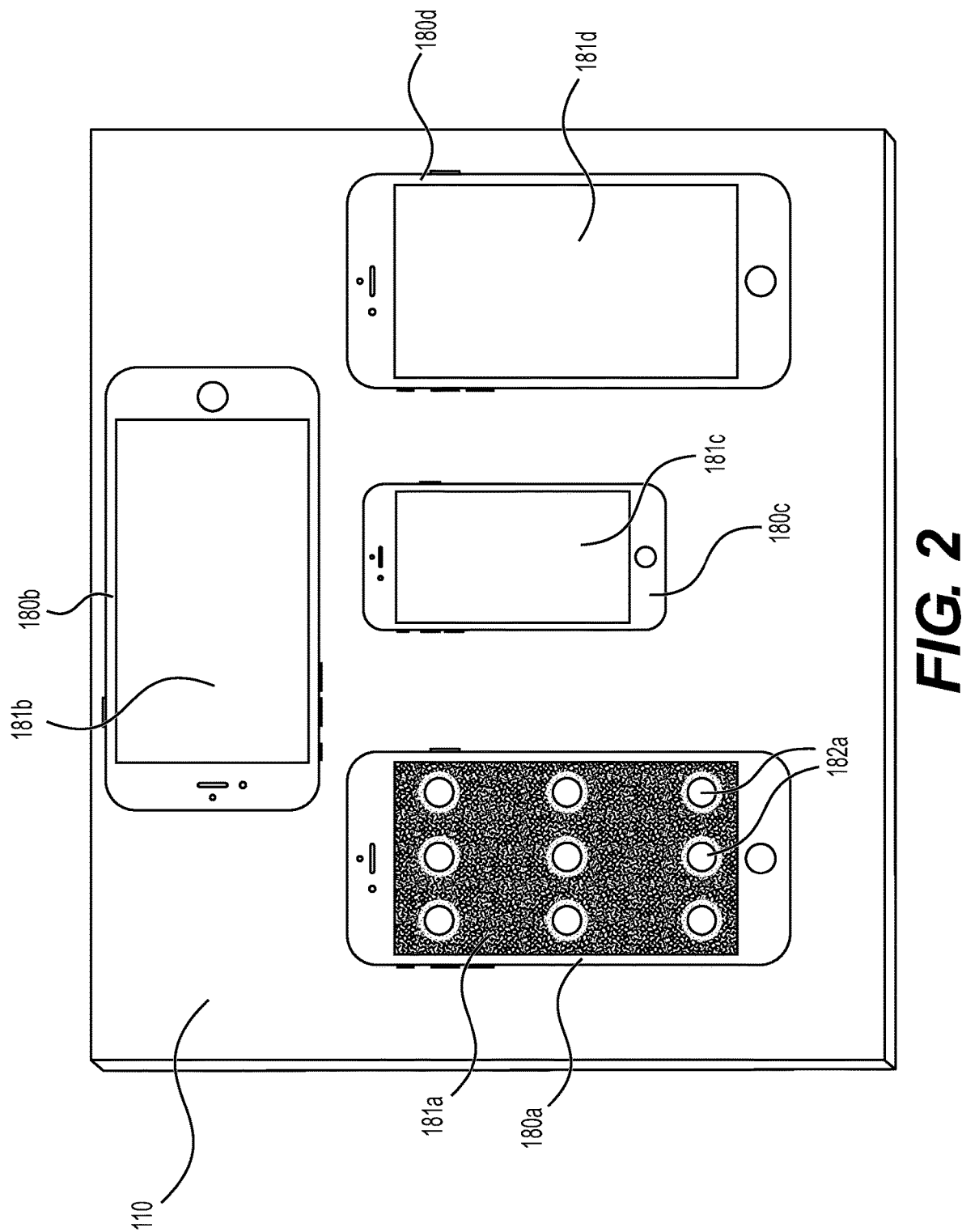
FIG. 2 is an example flow chart for an automated calibration, testing, and report generation method as described herein.
Figure 2:
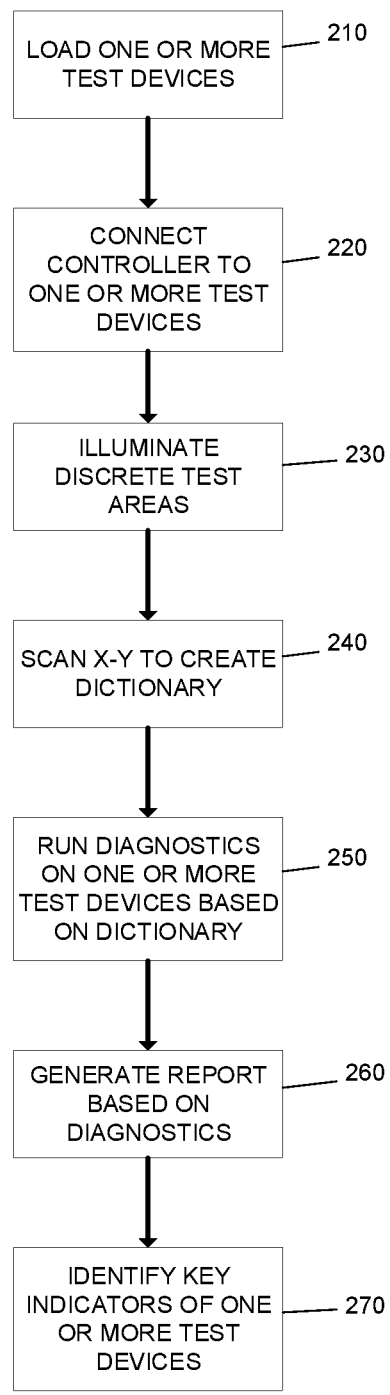
Figure 3:
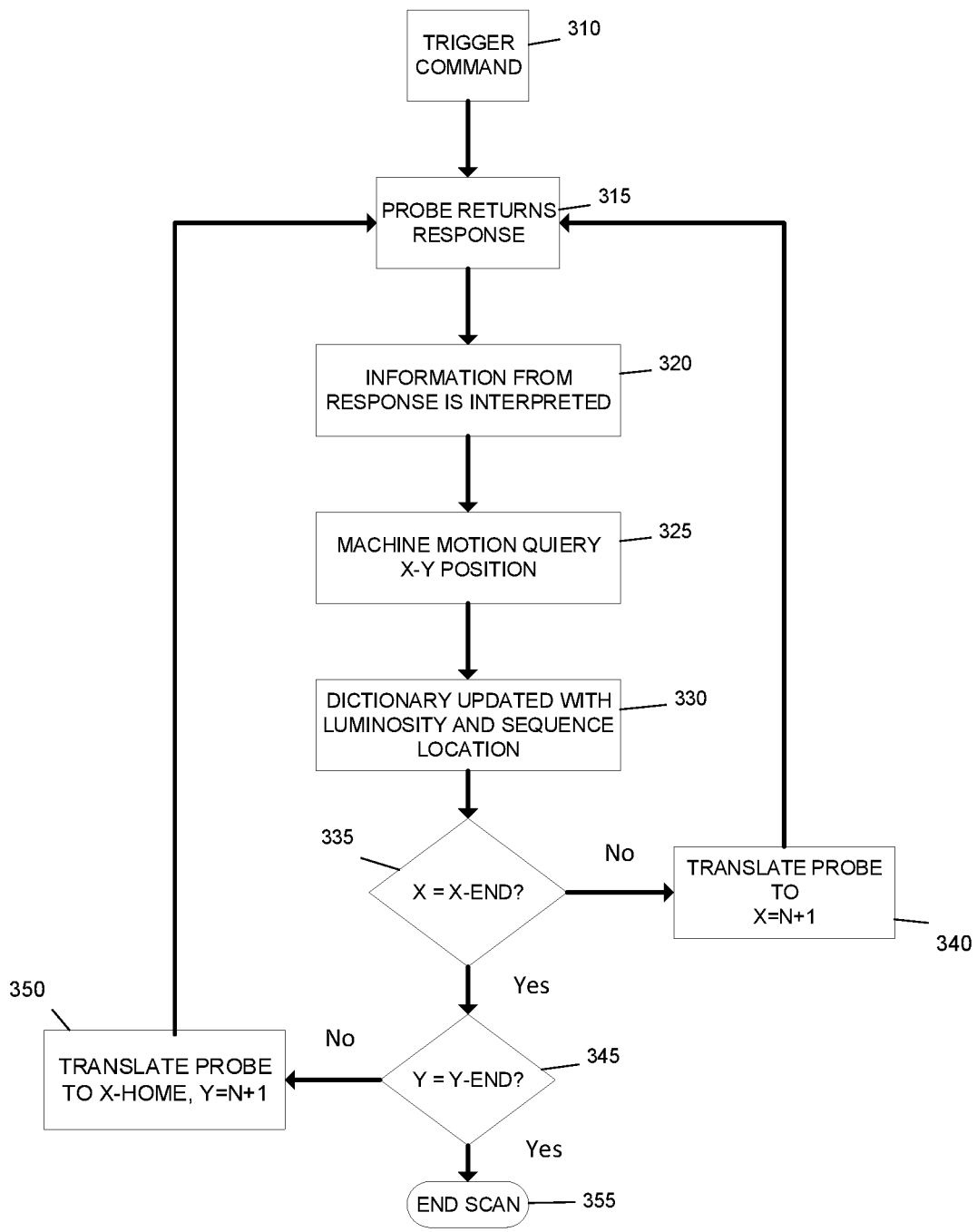
FIG. 3 is an example flow chart for the automated control of a display device to illuminate points of interests on the screen.

Example embodiments of the overall process are illustrated in FIG. 2, with step 240 of FIG. 2, further detailed in FIG. 3.

As illustrated in FIG. 2, at step 210 one or more DUTs 180 can be loaded onto gantry plate 110. There is no limit to the number of DUTs 180 that can be loaded onto gantry plate 110, as long as the one or more DUTs 180 can be properly secured to gantry plate 110. In example embodiments, the system can include one or more sensors 141 to identify how many DUTs are located on gantry plate 110 and their location on gantry plate 110. This information can be transmitted to controller 160.

Once properly placed on the gantry plate 110, at step 220 controller 160 can remotely access and operably connect to the one or more DUTs 180 at step 220. As discussed earlier, the connection can be by wireless communication or via cable communication. If via cable, then each DUT 180 would be cable connected to controller 160 when loaded onto gantry plate 110. The communication connection controller 160 can make to each DUT 180 can be via a debug bridge as previously described. In example embodiments, the communication connection is made using ADB.

Once in communication via debug bridge, at step 230 controller 160 can command the one or more DUTs 180 to illuminate discrete areas of the respective display screens to display bright luminance images as previously described. In an example embodiment, controller 160 can command one or more DUTs 180 to display nine equidistant bright images on its display screen.

Once the bright images are displayed, at step 240 controller 160 can control the scanning mechanism to scan the display screen of an illuminated DUT 180 to create a dictionary of keys and values representative of the display screen output. This scanning process and creation of a dictionary is described in conjunction with FIG. 3.

FIG. 3 illustrates an example flow diagram of an illustrative scanning process that can be used to generate a dictionary. The system can start by having controller 160 sending gantry plate 110 to a pre-established position that can be referred to as "X-home" and "Y-home". This position can be recorded as the starting position. At this position, a probe 150, such as color analyzer, can be directed at a set location in the X-Y plane of the display screen of one of the one or more DUTs 180 located on gantry plate 110.

As described earlier, the one or more DUTs 180 located on gantry plate 110 can be positioned so that their display screen faces the one or more probes 150. In an example embodiment as previously illustrated in FIGS. 1A and 1B, the gantry plate 110 can include a horizontal surface upon which the one or more DUTs 180 can be removably secured. Each of the one or more DUTs 180 located on the top horizontal surface of gantry plate 110 can lay flat with its display screen facing upward and parallel to the top surface of gantry plate 110. The one or more probes 150 can be positioned to be located above and over the display screen of the one or more DUTs 180 at a predetermined vertical distance monitored by the one or more sensors 141.

Once set at the X-Y home position, controller 160 can send a trigger command 310 to a probe 150. The command can be sent, for example, via pySerial as previously described. In response to the trigger command, a probe 150 can take one or more readings and return a serial response 315. The serial response can be read by pySerial. The value response can be interpreted at 320. In conjunction with receiving the serial response, controller 160 can query the position of the probe 150 relative to the X-Y plane of the surface of the display screen of a DUT 180. This will provide the location on the DUT display screen where probe 150 took the measurement or reading. The X-Y plane position on the surface of the display screen can be retrieved based on the controls of the gantry system. For example, the position can be derived through the MachineMotion API. In an example embodiment, the position can be retrieved from the motor 130.

In embodiments, the interpreted value can be indicative of a luminance value of the display screen of the DUT 180 at the location the probe 150 took the measurement. The interpreted value of the luminance reading and the measurement location on the screen of the DUT 180 can be stored into memory. In example embodiments, the measurement taken by probe 150 is a luminance reading. As discussed herein, the measurement location or luminance reading location on the screen of a DUT 180 can also be referred to as the position of probe 150 in the X-Y plane relative to the surface of the screen of the DUT 180. When stored, the measurement location or luminance reading location and interpreted value or luminance reading can be correlated. This can be repeated for each serial response probe 150 sends to controller 160. A correlated measurement location on the display screen of DUT 180 can be stored and correlated to each serial response probe 150 sends to the controller. In this manner, a dictionary can be created. The dictionary can have a key and value fields. In an example embodiment, the key can be the X-Y plane measurement location or luminance reading location on the display screen of a DUT 180, and the value can be the correlated luminosity value or luminance reading registered by probe 150. Alternatively, the key can be the luminosity value or reading and the value can be the measurement or luminance reading location.

Once a luminosity value or reading and correlated measurement or luminance reading location are registered in the dictionary, controller 160 can command gantry system 100 and motor 130 to translate the DUT 180 relative to probe 150. In example embodiments, controller 160 can cause gantry plate 110 to translate in the X-direction, Y-direction, or both. Once the gantry plate 110 is translated, probe 150 can return a second reading, which can be stored in the dictionary and correlated to the newly acquired measurement or luminance reading location in the X-Y plane of the display screen of DUT 180.

To determine whether the gantry plate 110 should be translated in the X direction or Y direction or both, controller 160 can query whether the position of probe 150 relative to the display screen of DUT 180 is at the edge of the display screen in the X-direction.

At step 335, controller 160 can query whether the position of probe 150 relative to the display screen of DUT 180 is at the edge of the display screen in the X-direction. In example embodiments X-home can be the X-position at one edge of a DUT display screen and X-end can be used to indicate the X-position of the opposite edge of the DUT display screen in the X-direction. The X-home and X-end positions can be preset in the motor 130. The X-home and X-end positions can be detected automatically by one or more sensors 141 once a DUT 180 is placed on gantry plate 110. In example embodiments, the X-home and X-end positions can be detecting via a serial response switch. In this manner as the DUT 180 is translated in the X-direction, probe 150 scans the display screen of the DUT 180 from X-home to X-end. After each measurement or luminance reading, controller 160 can query whether the X-position at which the last measurement or luminance reading by probe 150 was taken is less than X-end. If that is true, then the measurement or luminance reading taken was not yet at the second edge of the display screen. In this case, controller 160 can command gantry plate 110, which holds the DUT 180, to translate in the X-direction by one predetermined unit of measure as indicated at step 340, e.g. $X_{N+1}$, and then loop back to the step 315 for collecting a new reading to add to the dictionary.

If at step 335 the system determines that the X-position of the last measurement or luminance reading location is not less than X-end, then the system will determine that it has scanned the full length of the display screen in the X-direction. In this case, controller 160 can then query at 345 whether the last measurement or luminance reading location is at the edge of the display screen in the Y-direction. Similar to the X-direction, in example embodiments, Y-home can be set as the Y-position of one edge of the display screen of a DUT, and Y-end can be designated as the Y-position of the display screen edge opposite the Y-home position in the Y-direction. Like X-home and X-end, the Y-home and Y-end positions can be present in the motor 130. The Y-home and Y-end positions can also be similarly determined using one or more sensors 141 that can detect the presence of a DUT placed on gantry plate 110. In example embodiments, the Y-home and Y-end positions can be detecting via a serial response switch. Thus, as the DUT is translated in the Y-direction the scanning process is carried out from Y-home to Y-end.

According to query 345 if controller 160 determines that the last measurement or luminance reading taken was at Y-position that is not less than Y-end, then controller 160 determines that it is not yet at the edge of the display screen in the Y-direction. Based on this determination, controller 160 can send a command to cause gantry plate 110 to translate in the Y-direction at step 350.

In example embodiments, controller 160 can be designed to perform a linear scan of the display screen of a DUT 180 one row in the X-direction at the time. Other scanning patterns can also be configured. In example embodiments, as illustrated at step 350, once controller 160 determines that the relative position of probe 150 where the last measurement or luminance reading was taken in the X-direction is not less than X-end, but in the Y-direction it is less than Y-end, then controller 160 can cause the gantry plate 110 to translate so that probe 150 is position at the first position in the X-direction, e.g. X-home position, on the next row in the Y direction, e.g. $Y_{N+1}$. Once gantry plate 110 is repositioned at the start of the next row, i.e. X-home and $Y_{N+1}$, the system then loops back to the measurement or luminance reading collection process at step 315.

The system can repeat the serial collection of the luminance readings or measurements translating the gantry plate 110 in the X-direction and Y-direction until it determines that the location at which the last measurement or luminance reading was take was at a X-position that is not less than X-end, and at the Y-position is not less than Y-end. As indicated in FIG. 3, once the X-position and Y-position are no longer less than X-end and Y-end, the scanning process for that DUT 180 ends at 355. At this point, the full display screen of a DUT 180 will have been scanned and a complete dictionary with the serial measurements or luminance readings at each translation interval with correlated X-Y measurement locations on the display screen of DUT 180 will have been created.

The amount of translation in the X or Y direction can be dependent on the motor 130. As discussed earlier, this distance can be based on length such as inches or pixels and can be set based on the motor.

Also, instead of a set of serial translations for each measurement or luminance reading, the process could be implemented by translating the gantry plate 110 and thus a DUT 180 so that probe 150 can continuously scan a portion of the display screen collecting serial luminance readings or measurements along the way. For example, gantry plate 110 can be translated so that probe 150 continuously scans the full width or height of the display screen of the DUT 180 in one smooth movement while serially collecting luminance readings or measurements. The dictionary can then be generated for any interval of measurements or luminance readings and respective measurements or luminance readings locations desired rather than it be limited by the incremental motion the motor 130 is able to effectuate.

In example embodiments where more than one DUT 180 is located on gantry plate 110. In such embodiments, when one DUT 180 is translated in the X-Y directions during scanning, the additional DUTs 180 located on gantry plate 110 can also be simultaneously translated. The system can either repeat the scanning process for each DUT 180 in a serial manner. Alternatively, the system can employ multiple overhead bridges 102, and probes 150, and perform the scan simultaneous for two or more DUTs 180. In yet another embodiment, the system can perform overall linear scan of gantry plate 110 with probe 150 recording the serial readings only where probe 150 is over a display screen of a DUT 180 and storing that information in the respective dictionary along with the X-Y position of the measurement or luminance reading location on the display screen of that particular DUT 180.

Once a display screen of a DUT 180 has been fully scanned and a dictionary created, controller 160 will have the information necessary to determine the points of interests to conduct the testing of the display screen. Based on the dictionary the system can determine locations of areas of the display screen at which the luminance readings are higher than the luminance reading taken at other areas of the display screen. The system can thus recognize the brightest luminance areas and the darkest areas of the display screen of DUT 180. In example embodiments, the system will thus have located the brightest luminance areas on the display screen of a DUT 180. For example, if controller 160 commanded the DUT 180 to display nine bright objects, the dictionary created based on the scanning will have recorded the location of those bright luminance objects in the X-Y plane of the display screen of that DUT 180.

Using the information from the dictionary the system can then translate gantry plate 110 to properly position the display screen of a DUT 180 relative to probe 150 when running display diagnostics.

Turning back to FIG. 2, for example, after the dictionary is created at step 240, controller 160 can command gantry system 100 at step 250 to run diagnostics of the one or more DUTs 180. The types of diagnostics that can be run is not limited. In example embodiments, the diagnostics can include a flicker test, a luminosity test, a color state test, or any combination thereof. Additional tests using probe 150 or any other sensor or probe can also be run. In running the diagnostics, controller 160 can continue to control the one or more DUTs 180 whether to display different images, at different brightness. Relying on the created dictionary, controller 160 can control the gantry plate 110 position so as to retrieve the relevant diagnostic reading using probe 150 or other device at a point of interest on a display screen.

A point of interest can be a location in the display screen of a DUT 180 where during scanning at step 240 the luminosity is brighter than elsewhere on the display screen. In example embodiments, when during scanning a DUT 180 is controlled to display bright images, each bright image may coincide with a point of interest on the display screen. Thus, a point of interest can be identified based on the correlated data stored in the dictionary. For example, if a DUT 180 is controlled to display nine bright images, then that DUT 180 can have nine points of interest, each point corresponding to the location on the display screen in which one of the nine bright images appear during scanning. The location being known based on the dictionary that correlates the brightness of every point of the display screen of the DUT 180 that has been scanned. The point of interest can be a single pixel. The point of interest can be a group of pixels. The point of interest can be an area of the surface of the display screen of the DUT 180.

As information from diagnostics is collected during step 250, it can be stored by controller 160 and processed to generate one or more reports of display characteristics, derived display characteristics, or both as indicated in step 260. In example embodiments, reports can be graphical representations, tabulated data, or any combination thereof. Example display characteristics that can be reported include luminosity, chromaticity, flicker or waveform. Example derived characteristics that can be reported include brightness steps or sweeps, percentage of crosstalk and viewing angles, ambient light sensor (ALS) response curve, battery response curve, and blue-light filter efficacies. The processing and interpretation of the measured values can be done in accordance with industry standards.

In addition to providing the reports at step 260, based on the diagnostics and processed information from steps 250 and 260, controller 160 can, at step 270, also identify and report key performance indicators for the display screen of a DUT 180. For example, the system can provide information regarding second source componentry and aged screen effects.

These performance key indicators, that can also be based on industry standards, can assist in determining whether the quality of the display screen of a given DUT is sufficient for distribution of the device to an ultimate user. Some example display characteristics for example that may be desirable include best in class performance at all brightness levels. It may also be desirable to ensure that the crosstalk, color uniformity, and viewing angles meet class reference device. With respect to derived characteristics, it may be desirable to ensure that ALS responses and brightness curves meet class reference device. Also, it may be desirable to confirm logical adherence of drain response to brightness sweep or steps. It may also be desirable to ensure that nightlight or blue-light filters shift chromaticity register by a given percentage. Quality indicators that can be of interest include second source componentry being comparable or better than first source, or that a display can maintain minimum standard after simulated aging.

The system described herein can allow for an efficient, autonomous, consistent, and repeatable diagnostics independent of a device size, and thus eases the generation of reports and key performance indicators for any device of interest. For a distributor, the system described herein can be employed to validate manufacturer specifications and evaluations. The system can provide a second source of component verification and defect indicators.

Although features and/or methodological acts are described above, it is to be understood that the appended claims are not necessarily limited to those features or acts. Rather, the features and acts described above are disclosed as example forms of implementing the claims.

What is claimed is:

1. A system to autonomously test display screen performance comprising:

a scanning mechanism comprising a two-directional mobile gantry plate, the gantry plate configured to hold a first test device having a first display screen and a second test device having a second display screen;
a probe mounted on the scanning mechanism; and
a controller operably connected to the scanning mechanism and configured to:
determine a number of test devices located on the gantry plate;
identify the first test device and the second test device in response to determining the number of test devices located on the gantry plate;
establish a connection with at least the first test device;
automatically access a screen size of at least the first display screen from hardware information stored in a memory of the first test device subsequent to establishing the connection with the first test device;
operate a test device to illuminate discrete areas of the first display screen based on the screen size of the first test device;
control the scanning mechanism to scan the first display screen with the probe;
control the probe to record luminance readings of the first display screen while the first display screen is being scanned;
track locations on the first display screen where the recorded luminance readings are taken during the scan;
correlate the tracked locations of the recorded luminance readings to the respective recorded luminance readings;
store the correlations of the tracked locations and the recorded luminance readings in a memory of the system;
determine locations of areas of the first display screen at which the luminance readings are higher than the luminance readings taken at other areas of the first display screen; and
perform one or more of a flicker test, luminosity test, and color state test at the determined locations.

2. The system of claim 1, further comprising a sensor to sense the distance between the probe and a surface of the first display screen.

3. The system of claim 1, wherein the probe comprises a color analyzer for recording the luminance readings.

4. The system of claim 1, wherein the controller comprises a debug bridge to control the first test device.

5. The system of claim 1, wherein the controller comprises an application programming interface for controlling the scanning mechanism.

6. The system of claim 1, further comprising a step motor for operating one or more components of the scanning mechanism.

7. The system of claim 1, wherein the gantry plate is further configured to secure the first test device with the first display screen facing the probe and the two directions of movement of the gantry plate are parallel to the surface of the first display screen of the first test device when mounted onto a support plate.

8. The system of claim 7, wherein the probe is mounted onto an adjustable mount located over the gantry plate and configured to move the probe in a direction perpendicular to the surface of the first display screen of the first test device when mounted onto the gantry plate.

9. A method of autonomously testing a display screen, the method comprising:

determining a number of test devices located on a gantry plate;
identifying a first test device and a second test device in response to determining the number of test devices located on the gantry plate;
remotely accessing the first test device using a controller and a debug bridge;
establish a connection with the first test device;
automatically accessing screen size information of the display screen of the first test device by remotely accessing hardware information stored in a memory of the first test device subsequent to establishing the connection with the first test device;
remotely controlling the first test device to illuminate a plurality of discrete areas of the display screen based on the screen size information;
scanning the display screen with a color analyzer and recording luminance readings at different locations on the display screen while translating the first test device in two directions parallel to a surface of the display screen;
tracking locations on the display screen where the luminance readings are recorded;
correlating the recorded luminance readings with corresponding tracked location of where the luminance readings were taken on the display screen and storing the correlated information; and
testing the display screen for one or more of a flicker, luminosity, and color state using the color analyzer based on the stored correlated information.

10. The method of claim 9, wherein the luminance readings are recorded at constant intervals.

11. The method of claim 10, wherein the intervals are approximately 1 mm in length.

12. The method of claim 9, further comprising creating a dictionary having a key and a value, wherein the key is either one of the luminance readings or the tracked locations of the luminance readings on the display screen, and the value is the other of the one luminance readings or the tracked locations.

13. The method of claim 9, further comprising remotely controlling one or more display settings of the display screen during the testing.

14. The method of claim 9, further comprising placing the first test device on a gantry system equipped with the color analyzer prior to retrieving the screen size information.

15. The method of claim 14, further comprising:
automatically accessing a second screen size of a second display screen of the second test device by remotely accessing hardware information of the second test device;
remotely control the second test device to illuminate a plurality of areas of the second display screen based on the second screen size;
scanning the second display screen and recording second luminance readings at different locations of a surface of the second display screen while simultaneously translating the second test device along with the first test device;
correlating the recorded second luminance readings with second locations of the luminance readings on the second display screen and storing the additionally correlated information in the memory;
testing the second display screen for one or more of a flicker, luminosity, and color state using a color analyzer based on the stored additional correlated information.

16. The method of claim 9, wherein the illuminating the plurality of discrete areas of the display screen based on screen size comprises illuminating nine equidistant areas.

17. The method of claim 9, further comprising controlling a perpendicular distance between a probe and the surface of the display screen.

18. The method of claim 17, further comprising sensing the perpendicular distance between the probe and the surface of the display screen with a sensor.

19. The method of claim 9, further comprising generating a report based on the testing the display screen.

20. The method of claim 9, wherein the hardware information comprises phone state information stored in the memory of the first test device.

\* \* \* \* \*